United States Patent
Cosan et al.

[11] Patent Number: 5,923,143
[45] Date of Patent: Jul. 13, 1999

[54] SOLID STATE MOTOR STARTER WITH ENERGY RECOVERY

[75] Inventors: Muhammet Cosan, Dover, Pa.; Kraig W. Bockhorst, Rockford, Ill.; Harold R. Schnetzka, York, Pa.

[73] Assignee: York International Corporation, York, Pa.

[21] Appl. No.: 09/044,789

[22] Filed: Mar. 20, 1998

[51] Int. Cl.$^6$ ................................................ H02P 1/24
[52] U.S. Cl. .................... 318/729; 318/778; 318/809; 323/224; 323/908; 307/127
[58] Field of Search .................... 323/224, 225, 323/271, 299, 908; 307/125, 130, 131, 126, 127; 318/729, 798–802, 805, 809–811, 778, 779, 781, 758, 759, 376

[56] References Cited

U.S. PATENT DOCUMENTS

| | | | |
|---|---|---|---|
| 3,896,369 | 7/1975 | Nakata | 323/19 |
| 3,958,131 | 5/1976 | Mozdzer | 307/106 |
| 3,987,357 | 10/1976 | Edstrom et al. | 323/17 |
| 4,323,845 | 4/1982 | Leach | 323/224 |
| 4,408,268 | 10/1983 | Peters et al. | 363/62 |
| 4,629,960 | 12/1986 | Welsh et al. | 318/729 |
| 4,668,908 | 5/1987 | Aoki et al. | 323/324 |
| 4,675,802 | 6/1987 | Sugimoto | 363/164 |
| 4,763,219 | 8/1988 | Nakamura | 361/23 |
| 4,763,347 | 8/1988 | Erdman | 318/254 |
| 4,801,859 | 1/1989 | Dishner | 323/224 |
| 4,931,715 | 6/1990 | Lee et al. | 318/709 |
| 4,965,508 | 10/1990 | Soan | 323/239 |
| 5,235,504 | 8/1993 | Sood | 363/53 |
| 5,283,726 | 2/1994 | Wilkerson | 363/41 |
| 5,498,946 | 3/1996 | Plumer et al. | 318/809 |
| 5,668,466 | 9/1997 | Vinciarelli et al. | 323/282 |
| 5,736,795 | 4/1998 | Zuehlke et al. | 307/130 |
| 5,781,390 | 7/1998 | Notaro et al. | 361/84 |
| 5,838,144 | 11/1998 | Wills et al. | 323/238 |

FOREIGN PATENT DOCUMENTS

| | | |
|---|---|---|
| 0 221 574 A2 | 5/1987 | European Pat. Off. . |
| 44 28 682 A1 | 2/1996 | Germany . |

*Primary Examiner*—Brian Sircus
*Attorney, Agent, or Firm*—Finnegan, Henderson, Farabow, Garrett & Dunner, L.L.P.

[57] ABSTRACT

A motor starter circuit providing recovery of the energy trapped in the motor windings when the supply voltage and current have opposite polarities by selectively controlling actuation of a plurality of high speed switches. The circuit, for use with a multiphase motor and power source that provides positive and negative voltage alternations which result in the generation of a load current in the motor having positive and negative alternations, includes a plurality of switch-diode combinations electrically configured such that for a given pair of supply voltage/load current polarities, only one diode of each combination may be forward biased.

16 Claims, 7 Drawing Sheets

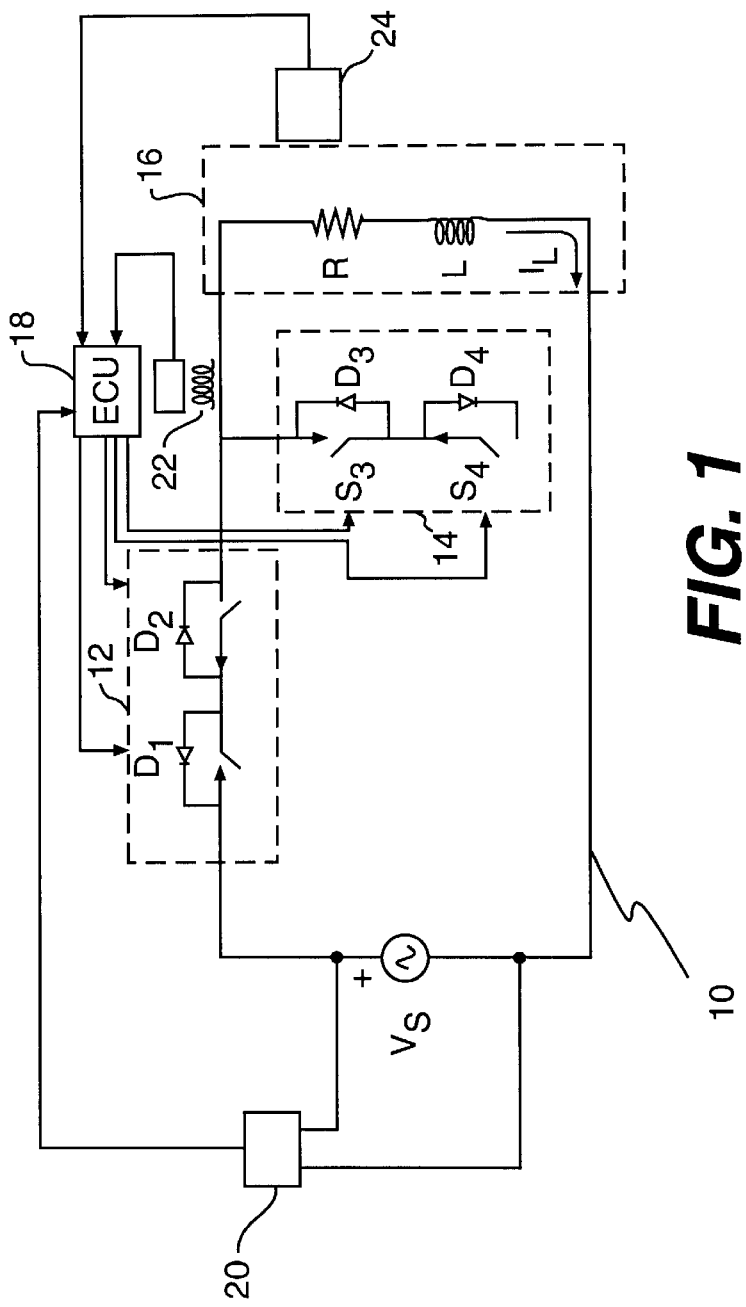
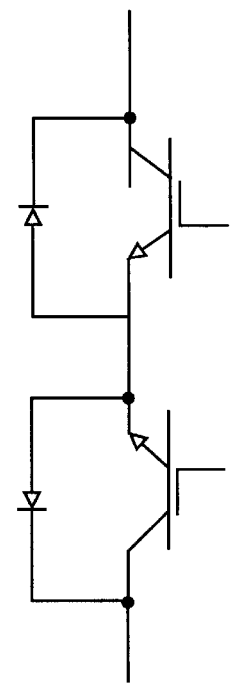
FIG. 1
FIG. 1a

LOAD CURRENT AND LOAD VOLTAGE

INPUT CURRENT AND INPUT VOLTAGE

SOLID STATE MOTOR STARTER WITH ENERGY RECOVERY

TECHNICAL FIELD

The present invention relates to starter circuits for use with heating, ventilating, and air conditioning (HVAC) induction motors and, more particularly, to a multi-phase motor starter circuit and control strategy for reducing line current drawn by a three-phase motor during starting and which provides for recovery of the energy trapped in the motor during starting.

BACKGROUND ART

In many applications, it is desirable to minimize the current drawn by a multiphase induction motor during starting. Starting, or in-rush, current for multi-phase motors tends to be 5–6 times the running current. Such high currents have many detrimental effects on the equipment and the power, as well as the economics of power usage. By means of example only, drawing such normal starting currents over a long power line can cause the voltage to essentially collapse, leaving insufficient voltage to accomplish the task. Furthermore, other customers along the same power line may experience undesirable voltage fluctuations during the start of the motor. To discourage this situation, power companies, especially in Europe, impose penalties if a customer's starting or in-rush currents are excessive.

Use of an autotransformer is one known methodology for achieving lower motor starting currents. Autotransformers, however, are relatively inflexible compared to the present invention in that the turns ratio of an autotransformer is established up front and remains fixed by the design of the components. Another approach employs the use of series elements such as inductors, resistors, and the like, to limit starting current. The latter approach, however, requires significantly higher line currents than autotransformer starters to provide the same amount of torque.

Recent developments in the power electronics technology provides for broad utilization of power semiconductor devices, such as IGBTs (i.e., insulated-gate bipolar transistors) or MCTs (i.e., MOS-controlled thyristors). These solid state devices can be used to provide an improved means for reduced voltage start-up control of commonly used three-phase induction motors as mentioned in the prior art. For example, U.S. patent application Ser. No. 08/852, 502, titled "A Solid State, Reduced Voltage Motor Starter Enabling Equalized Input/Output VA Rating" and filed on May 7, 1997, in the names of Frank Wills and Harold Schnetzka, the specification of which is hereby incorporated by reference in its entirety, discloses and claims a solid state starter circuit for a multi-phase motor that minimizes and selectively controls the amount of line current drawn by the motor during starting. That starter circuit, however, while an improvement over other known reducedcurrent starter circuits and methodologies, including autotransformers, requires the use of an energy current sink which stores or dissipates energy trapped in the motor windings during certain periods of each line cycle while the motor is starting up.

It is desirable, therefore, to provide an improved solid state motor starter with energy recovery, such that the use of a storage or dissipative device is not required. More particularly, it is desirable to recover the energy trapped in the motor windings so as to reduce the net energy drawn from the power lines to start the motor.

SUMMARY OF THE INVENTION

The present invention represents an improvement over the prior art and provides a solid state motor starter circuit including power semiconductor devices which are controlled to provide recovery of the energy trapped in the motor windings during motor starting. This energy is transferred back to the power lines on a cycle by cycle basis yielding a minimization of the motor current drawn during starting.

Additional desires, objects, and advantages of the invention will be set forth in part in the description which follows, and in part will be appreciated by one of ordinary skill from the description, or may be learned by practice of the invention. The objects and advantages of the invention will be realized and attained by means of the elements and combinations particularly pointed out in this application and the appended claims.

To achieve the objects and in accordance with the purpose of the invention, as embodied and broadly described herein, there is provided a starter circuit for use with a multi-phase motor and a multi-phase power source providing source voltage in the form of positive and negative voltage alternations which results in the generation of a load current in the motor having positive and negative alternations. The starter circuit includes a first pair of switch-diode combinations electrically connected in series with the multi-phase power source and the multi-phase motor, and a second pair of switch-diode combinations electrically connected in parallel with the multi-phase power source and the multi-phase motor. Each of the switches have an open state and a closed state. The starter circuit also includes a controller programmed to control the state of the switches based on the relative polarities of the supply voltage and the load current, so as to provide pulse-width modulated current to the motor during starting and to recover energy trapped in the motor and transfer it back to the multi-phase source when the supply voltage and load current have opposite polarities.

The present invention also comprises a method, for use with a starter circuit for a multi-phase motor and a multi-phase power source providing source voltage in the form of positive and negative voltage alternations resulting in a load current in the motor having positive and negative alternations. The starter circuit includes a first pair of switch-diode combinations electrically connected in series with the multi-phase power source and the multi-phase motor, a second pair of switch-diode combinations electrically connected in parallel with the multi-phase power source and the multi-phase motor, and a controller. The method includes controlling the state of the switches of the switch-diode combinations based on the relative polarities of the supply voltage and the load current so as to provide pulse-width modulated current to the motor during starting and to recover energy trapped in the motor and transfer it back to the multi-phase source when the supply voltage and load current have opposite polarities.

It is to be understood that both the foregoing general description and the following detailed description, taken in connection with the accompanying drawings, are exemplary and explanatory of the principles of the invention as claimed herein.

BRIEF DESCRIPTION OF THE DRAWINGS

FIG. 1 is a block diagram of a one-phase equivalent circuit of a motor starter circuit consistent with the present invention;

DETAILED DESCRIPTION OF THE INVENTION

Figure 2:
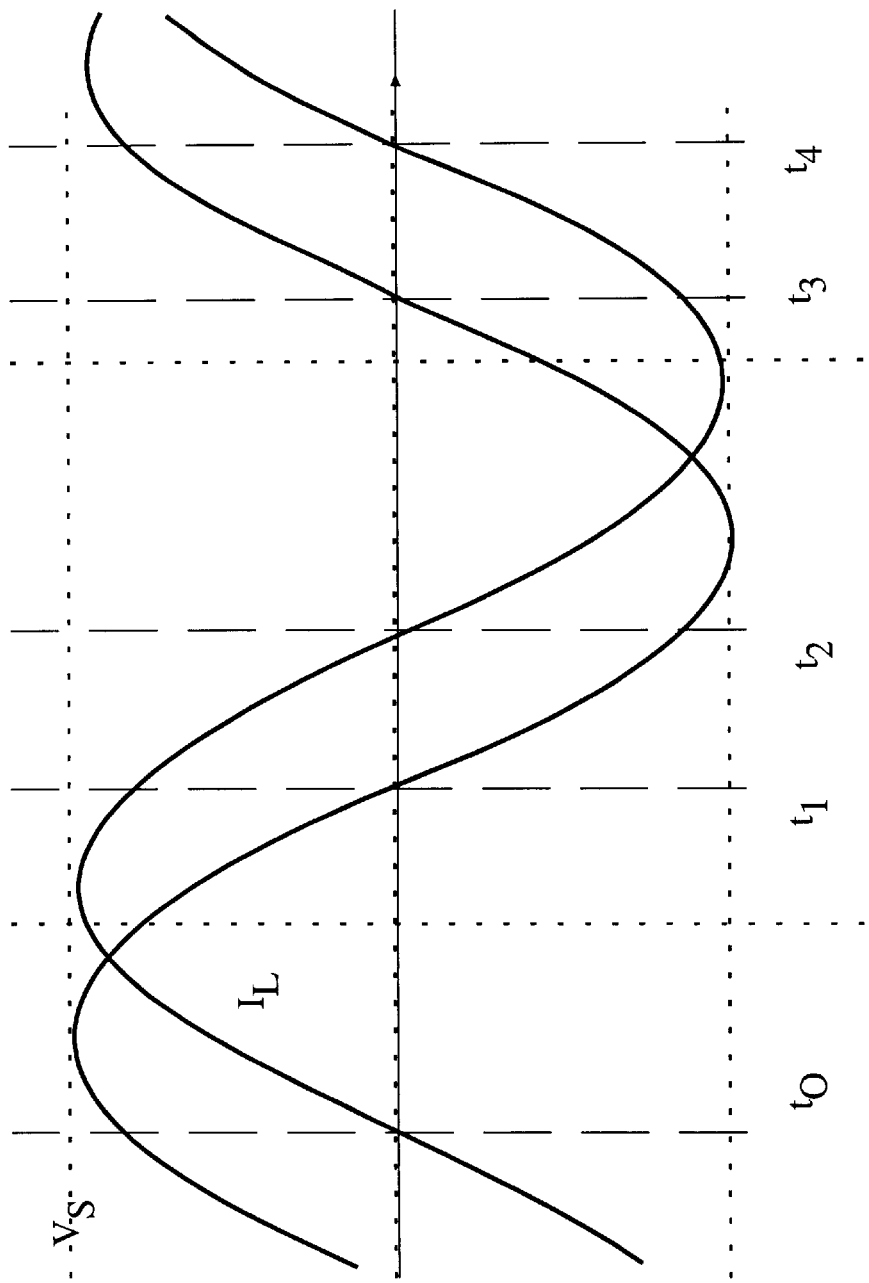
FIG. 2 is a graphical illustration of supply voltage ($V_S$) and load current ($I_L$) shown in FIG. 1.

Reference will now be made in detail to the preferred embodiments of the starter circuit of the present invention as illustrated in FIGS. 1 and 3–6. The voltage and current waveforms shown in FIGS. 2 and 7a–7b aid in the description of the present invention and will be referenced throughout this detailed description.

Referring first to FIG. 1, there is shown generally by reference numeral 10 a block diagram of a single-phase equivalent motor starter circuit consistent with the present invention. It should be appreciated by one of skill that the circuit shown is for use with a single phase, and that for a three-phase motor, three such circuits would be electrically interconnected. In the circuit shown, high-speed unidirectional solid-state switches with inverse connected diodes are shown. The direction of current flow through these switches is shown by the arrow on the switch. Such switches may be implemented using IGBTs, MCTS, mosfets, bipolar transistors, GTOs, etc. FIG. 1 a illustrates one alternate implementation using IGBTs. As described in greater detail below, the use of these switches, rather than regenerative or latching switches such as SCRs (silicon-controlled rectifiers), eliminates the need for reliance upon line commutation to terminate current flow. Furthermore, by using high-speed switches between the utility power line and the motor, voltage to the motor may be reduced by switching the devices at a much higher frequency than the power line frequency while varying the ratio of "on" (switch closed) to "off" (switch open) time. Simultaneously controlling the conduction of other solid-state switches shunting the motor, such as switches $S_3$ and $S_4$, permits the motor current to continue flowing during the time the switches connected to the power source, such as switches $S_1$ and $S_2$ are open.

As shown FIG. 1, the motor starter circuit 10 includes two four-quadrant switches 12 and 14 interconnected as shown with a power supply $V_S$ and an induction motor 16, which is shown in FIG. 1 as a simple R-L resistive/inductive load for purposes of this discussion. Switch 12, which is electrically connected in series with $V_S$ and the load 16, includes a pair of unidirectional solid state switches $S_1$ and $S_2$, and a pair of diodes $D_1$ and $D_2$ electrically connected in parallel with switches $S_1$ and $S_2$, respectively. More particularly, in the embodiment shown, diodes $D_1$ and $D_2$ are electrically connected such that for a given voltage signal polarity, only one of the two diodes conducts. It should be appreciated that one of the diodes conducts only when the alternate unidirectional switch is closed. For example, diode $D_1$ conducts only when switch $S_2$ is closed.

Switch 14, which similarly includes two unidirectional solid state switches ($S_3$ and $S_4$) and a pair of diodes ($D_3$ and $D_4$), is electrically connected in parallel with the supply and the load. As with the diodes of switch 12, diodes $D_3$ and $D_4$ are electrically connected in parallel with their associated switches and, with respect to each other, such that both can not conduct at the same time. Thus, if diode $D_3$ is forward biased and capable of carrying current, diode $D_4$ is disconnected or reverse biased and unable to carry current. In order for diode D3 to conduct, switch S4 must be closed, and for diode D4 to conduct, switch S3 must be closed. A switch controller, such as ECU 18 (which includes a microprocessor or the like not specifically shown for the sake of clarity) controls cycling of the switches $S_1$, $S_2$, $S_3$, and $S_4$ according to a control strategy, discussed in greater detail hereinbelow, and embodied in software executed by the microprocessor.

Power supply $V_S$ is an AC power source which generates a well-known sinusoidal voltage waveform with characteristic positive and negative voltage alternations. FIG. 2 illustrates such a voltage waveform (labeled $V_S$) with respect to time. As is known, voltage waveform $V_S$ in turn results in the creation of positive and negative current alternations in the load 16, such as waveform $I_L$ shown in FIG. 2. ECU 18 utilizes source voltage polarity information output by voltage direction sensor 20 and load current polarity information output by current sensor 22 to generate the control or gating signals for switches $S_1$–$S_4$. Each switch may be controlled by the ECU 18 to either a closed state during which time current is permitted to flow through the switch or an open state during which time current is not permitted to flow through the switch. It should be appreciated that if the switches are operated to repetitively cycle between those states, a pulse-width-modulated sinusoidal current may be caused to flow through motor 16.

Figure 3:
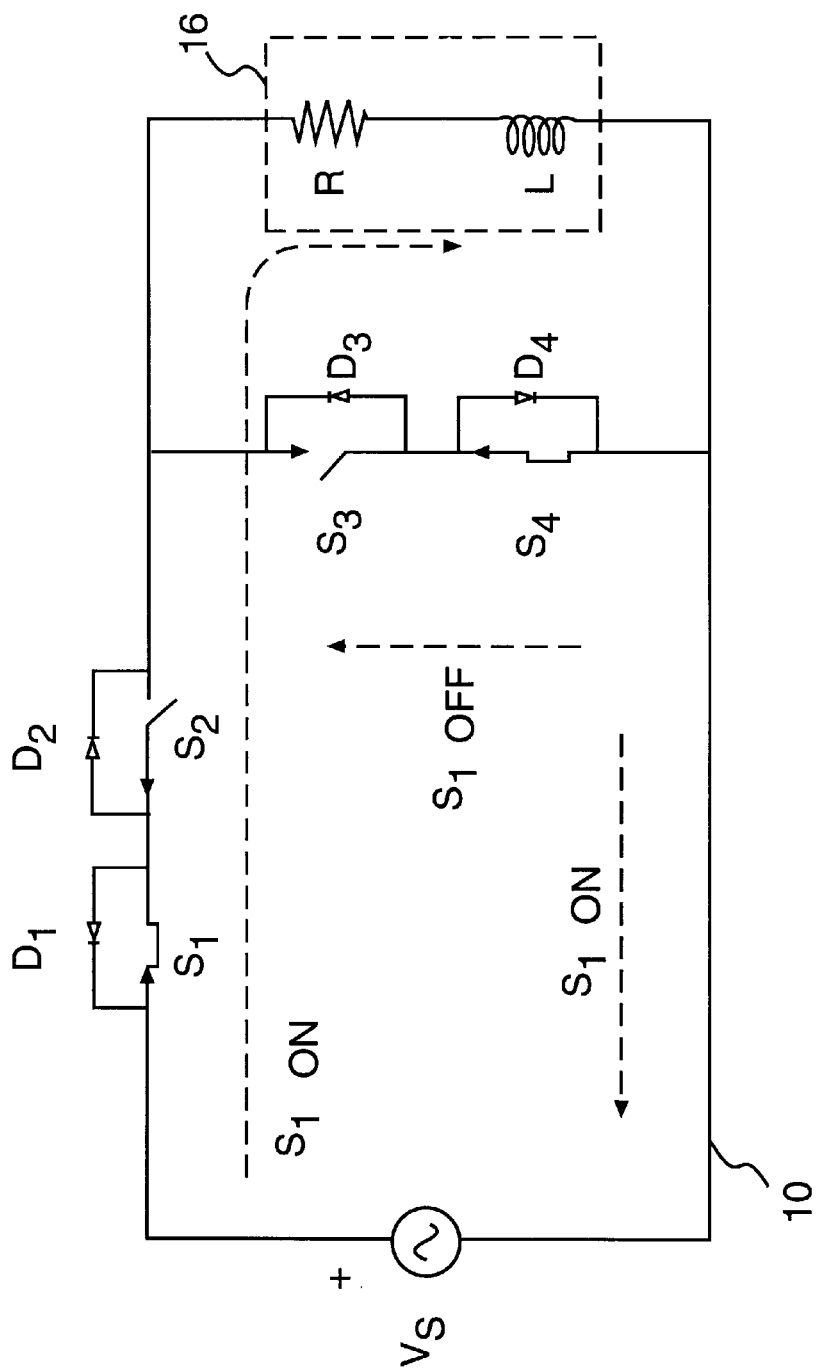
FIG. 3 is a block diagram illustrating the active current paths in the motor starter circuit shown in FIG. 1 during a first mode of operation.

FIGS. 3–6 are useful for discussing operation of the circuit shown in FIG. 1 during four possible modes of operation. Although the ECU 18 is not expressly shown on these figures, its implicit inclusion should be understood. In the first mode of operation, shown in FIG. 3, both load current and the supply voltage are positive (see FIG. 2, from time $t_0$ to time $t_1$). In this mode, switch $S_4$ is kept in a closed state, switches $S_2$ and $S_3$ are maintained in an open state, and switch $S_1$ is repetitively cycled, i.e., PWM controlled. Active current paths are shown by the dotted lines. According to this switch control strategy, when switch $S_1$ is on (ie., when the switch is in a closed state), current is supplied to the motor 16 from $V_S$ through $S_1$ and $D_2$, as shown in FIG. 3. Switch $S_4$ and diode $D_3$ form a free-wheeling path for the motor current when switch $S_1$ is off (i.e., when the switch is in an open state). The inductive nature of the motor load will cause the current to flow naturally, or free-wheel, through switch-diode combination $S_4/D_3$ when $S_1$ opens.

Figure 4:
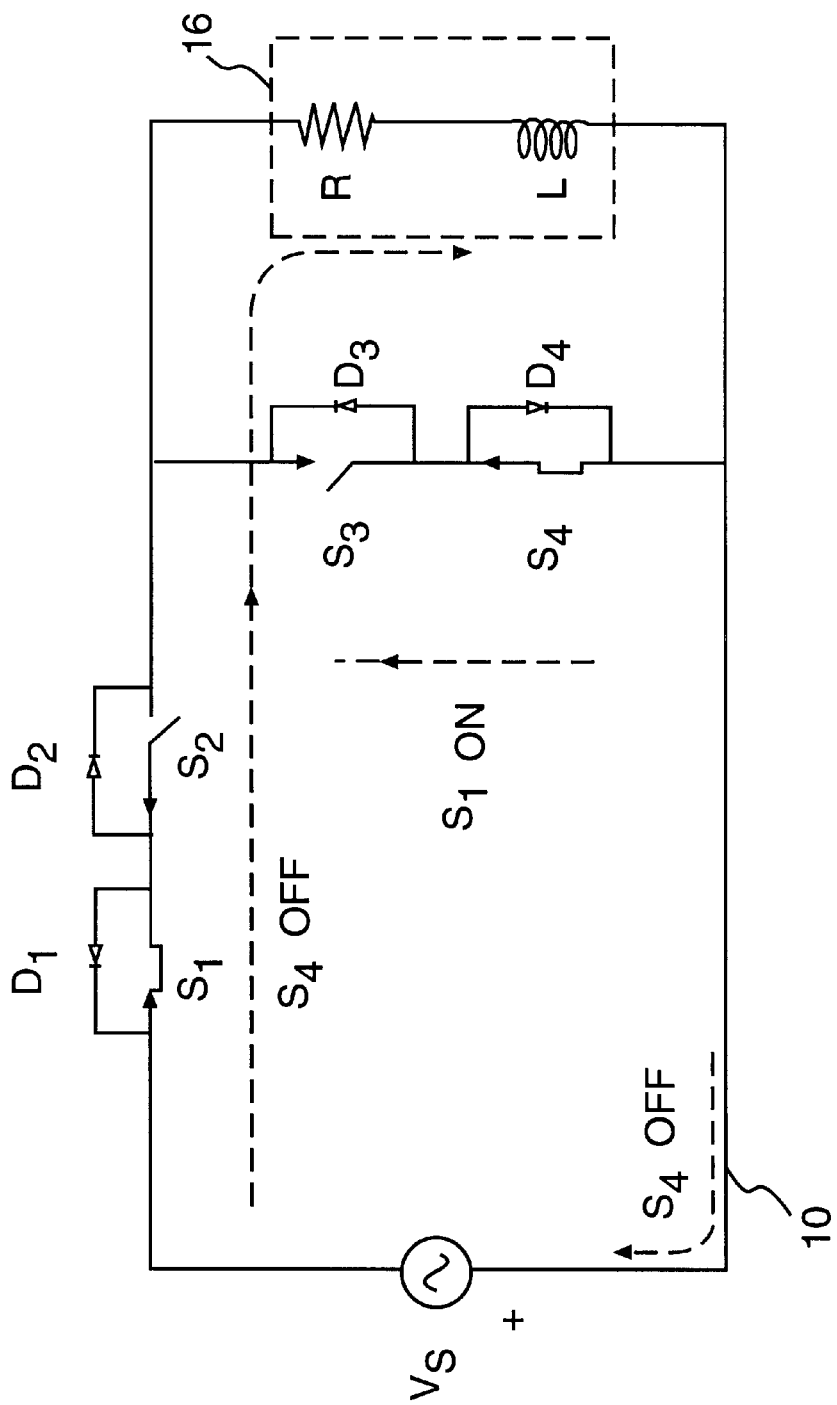
FIG. 4 is a block diagram illustrating the active current paths in the motor starter circuit shown in FIG. 1 during a second mode of operation.
Figure 5:
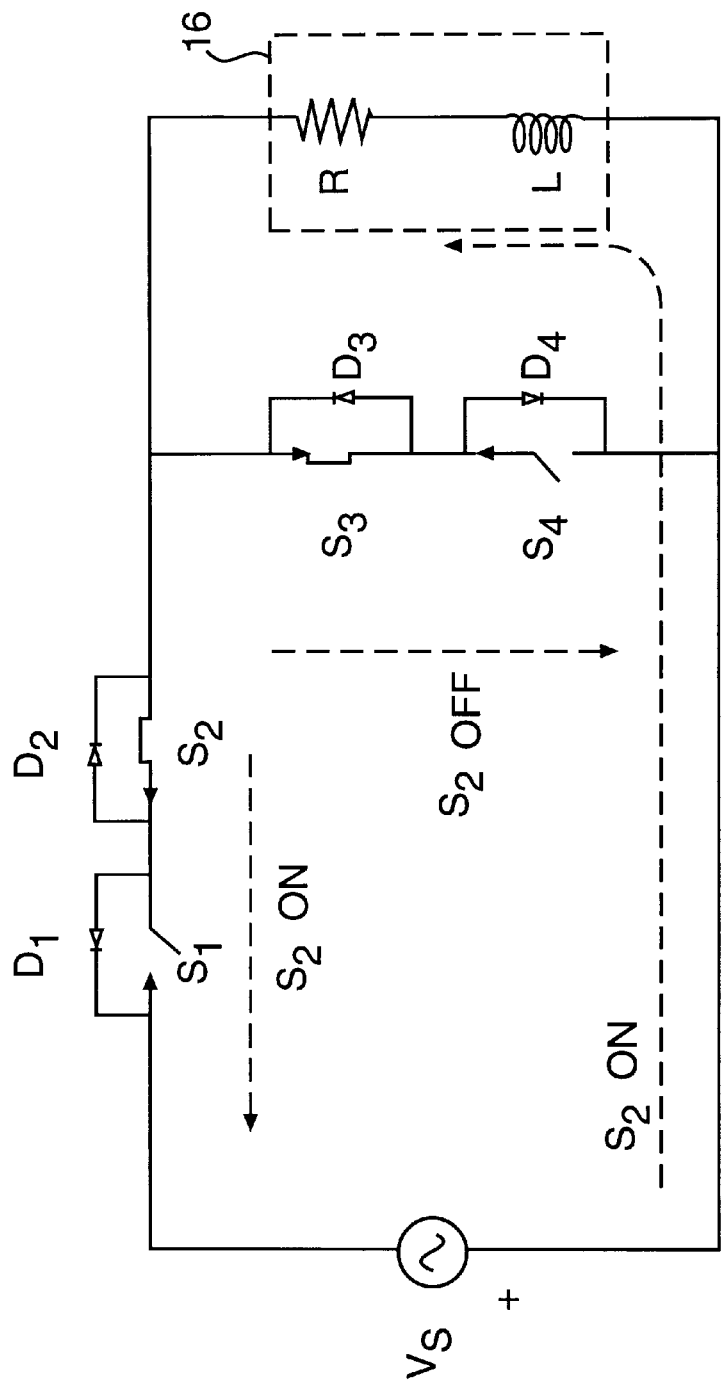
FIG. 5 is a block diagram illustrating the active current paths in the motor starter circuit shown in FIG. 1 during a third mode of operation.

Due to the inductive nature of the load, the supply voltage becomes negative before the load current does. When the supply voltage is negative and the load current remains positive (time $t_1$ to $t_2$ in FIG. 2), switches $S_1$–$S_4$ are controlled according to a second mode of operation, as illustrated in FIG. 4. In this mode, switch $S_1$ is kept closed, switches $S_2$ and $S_3$ are maintained in an open state for the duration of this time period, and switch $S_4$ is PWM controlled. With this switching strategy, when switch $S_4$ is off (ie., in an open state), current flows from the load to $V_S$ and through S1 and D2, and the energy trapped in the motor winding is transferred to the voltage source. When $S_4$ is closed, load current free wheels through $S_4$ and diode $D_3$. Thus, when the input voltage and load current have opposite polarities, the switches are controlled such that the energy trapped in the motor winding (an inductive load) is recovered and transferred back to the supply as a function of the switch duty cycle. This reduces the net apparent power drawn by the motor during starting and improves the power factor which, as is known, can be defined as the ratio of real power (Watts) to apparent power (Volt-Amps). It should also be appreciated by one of skill that use of this circuit topology and control strategy allows one to slowly raise the voltage to the motor during starting (which, for a 50 HP motor, can last approximately 30–40 seconds), thereby providing a soft motor start. From time $t_2$ until time $t_3$ (see FIG. 2), both the supply voltage and load current are negative. As depicted in FIG. 5, this mode of operation involves maintaining switch $S_3$ in a closed state, keeping switches $S_1$ and $S_4$ in an open state, and pulse width modulating switch $S_2$. This mode is analogous to the first mode (from time $t_0$ to time $t_1$) described above with a different switching combination. According to this switch control strategy, when switch $S_2$ is in a closed state, current is provided to the motor 16 through $S_2$ and $D_1$, as shown in FIG. 5. Switch $S_3$ and diode $D_4$ form a free-wheeling path for the motor current during the times switch $S_2$ is in an open state.

Figure 6:
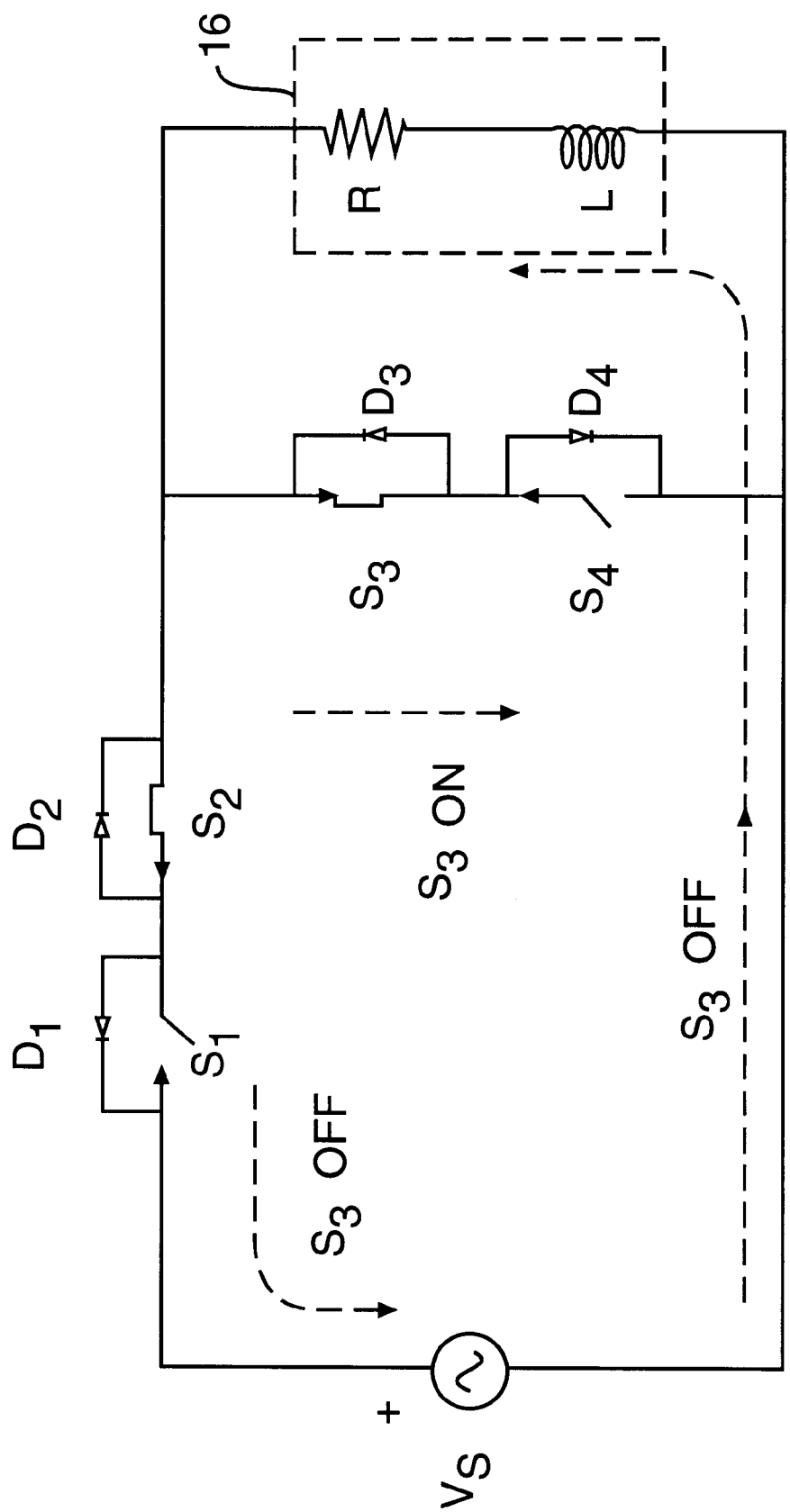
FIG. 6 is a block diagram illustrating the active current paths in the motor starter circuit shown in FIG. 1 during a fourth mode of operation.
Figure 7A:
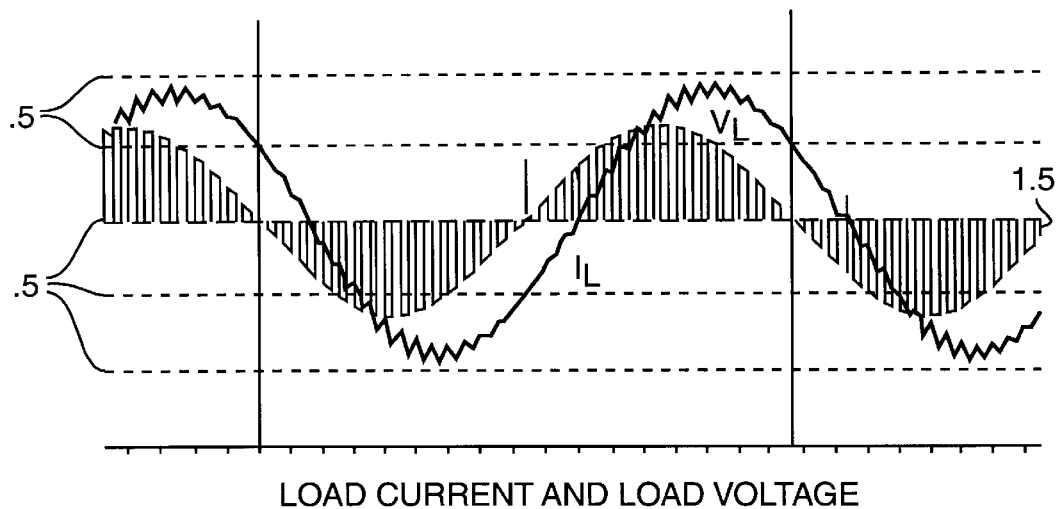
FIGS. 7a and 7b are graphical illustrations of load current ($I_L$) and load voltage ($V_L$), and input current ($I_S$) and input voltage ($V_S$), respectively, for the circuit of FIG. 1.
Figure 7B:
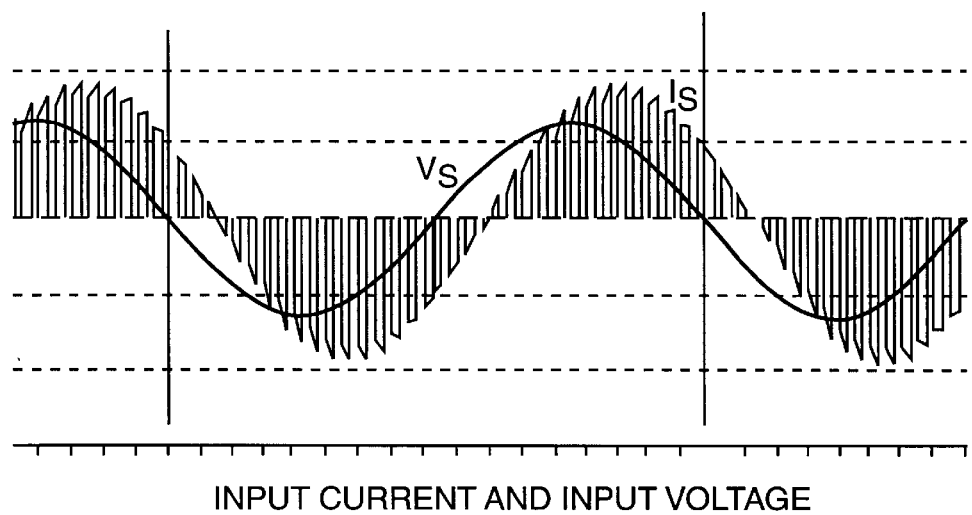

FIG. 6 shows the active current paths for operation of the circuit in a fourth mode, when $V_S$ is positive but load current is still negative (time $t_3$ to $t_4$ in FIG. 2). This mode is analogous to the second mode described above. In the fourth mode, ECU 18 controls switch $S_2$ to its closed state, whereas switches $S_1$ and $S_4$ are maintained in an open state. Switch $S_3$ is PWM controlled. As shown in FIG. 6, when $S_3$ is closed, an active free-wheeling current path is established through $S_3$ and $D_4$. However, when switch $S_3$ is open, the energy trapped in the motor is recovered as current provided back to the supply through $S_2$ and $D_1$.

Unlike some motor starters in the prior art, circuits consistent with the present invention advantageously do not require an energy sink at low power factors to either store or dissipate the reactive energy trapped in the motor. Further, as described above, energy is transferred from the source to the load only when the source voltage and the load current have the same polarity. Thus, only a small amount of energy is transferred to the load when the power factor is small, e.g., during motor starting, when commonly used three-phase induction motor/starter systems have poor power factors. Additionally, starter circuits consistent with the present invention reduce the current drawn from the source during motor start-up while improving the power factor without the need for an additional energy sink as in the prior art. After the motor is started, the motor emf (electromotive force) is established and the motor generally draws rated current, not the high current associated with starting. During post-starting, switches $S_3$ and $S_4$ are maintained in an open state and switches $S_1$ and $S_2$ are maintained in a closed state to facilitate motor operation.

Since the duty cycle of the switches can be selectively varied by controlling the cycling of the switches in the manner described above, the amount of line current drawn during starting can be varied so as to achieve the optimum, or any desired, result. Indeed, the amount of current drawn by a motor can be progressively changed during the start-up procedure. The present invention also contemplates use of one or more sensors such as sensor 24 (shown on FIG. 1) which sense operational parameters of the motor during start-up. The motor operating parameters sensed by sensors might include inter alia rotor acceleration, rotor velocity, and torque, just to name a few. Of course, which parameters are monitored will depend in large part on the particular application and numerous other operating parameters than those specified herein can be monitored with the appropriate sensor.

Signals from sensor 24, as well as sensors 20 and 22, may be applied to and used by a switch controller such as ECU 18 (shown in FIG. 1) which, as noted above, includes a microprocessor or the like (not specifically shown for the sake of clarity) for controlling closure of switches $S_1$, $S_2$, $S_3$, and $S_4$ as a function of the sensed parameters. In this embodiment, it should be appreciated that the microprocessor is programmed to control switch closure in a manner that generates a desired line current profile throughout the motor starting process. Yet another advantage associated with this embodiment is that the cycling of switches can be controlled to achieve lower starting current regardless of motor type.

In a typical application, motor starter circuits consistent with the present invention are used with three-phase induction motors having power ratings ranging from 10 to 1000 HP. The switches employed should be capable of switching high currents (e.g., 10 A–3000 A) at frequencies ranging from about 1 kHz to about 20 kHz. The load current and voltage and input current and voltage waveforms of FIGS. 7a–7b, which result from a switching frequency of approximately 2 kHz, are included for purposes of illustration. Of course, different switching frequencies may be selected if necessary. For example, a 20 kHz switching frequency for a 10 HP motor would provide a very smooth and generally ripple free load current waveform. However, a 2 kHz switching frequency for a 1000 HP motor is prudent in order to minimize power seminconductor losses related to switching. Further, it should be appreciated that output voltage and current can be adjusted by altering the duty cycle of the modulated switches. For example, a 50% duty cycle will result in a 50% reduction in the voltage applied to the motor during starting. In one application, the duty cycle of a compressor motor is slowly increased from 0% to a level which controls the motor RMS value of the current at a level of 25% of the level that would normally flow through the motor if the motor was applied directly across the power source. This provides the compressor with a "soft start," eliminating high in-rush currents and the undesirable manifestations of the associated line voltage dip (e.g., light flicker) while providing sufficient energy to start the system in a reasonable period of time.

It will be apparent to those skilled in this art that various modifications and variations can be made to the starter circuit and control strategy described herein consistent with the present invention without departing from the spirit and scope of the invention. Other embodiments of the invention will be apparent to those skilled in this art from consideration of the specification and practice of the invention disclosed herein. It is intended that the specification and examples be considered exemplary only, with a true scope and spirit of the invention being indicated by the following claims.

We claim:

1. For use with a multi-phase motor and a multi-phase power source providing source voltage in the form of positive and negative voltage alternations resulting in a load current in the motor having positive and negative alternations, a starter circuit for the motor comprising:

a first pair of switch-diode combinations electrically connected in series with the multi-phase power source and the multi-phase motor, each of the switches having an open state and a closed state;

a second pair of switch-diode combinations electrically connected in parallel with the multi-phase power source and the multi-phase motor, each of the switches having an open state and a closed state;

a controller programmed to control the state of the switches of the switch-diode combinations, based on the relative polarities of the supply voltage and the load current, so as to provide pulse-width modulated current to the motor when the supply voltage and the load current have similar polarities and to recover energy trapped in the motor and transfer it back to the multi-phase source when the supply voltage and load current have opposite polarities.

2. The starter circuit of claim 1 wherein each switch-diode combination includes a pair of switches electrically connected in parallel with a pair of diodes, and wherein the diodes are electrically configured such that only one diode of each combination conducts at a time.

3. The starter circuit of claim 1 wherein the controller is programmed to maintain the switches of two switch-diode combinations in an open position, to maintain the switch from one of the switch-diode combinations in a closed position, and to cycle the switch from one of the switch-diode combinations between an open state and a closed state.

4. The starter circuit of claim 2 wherein the second pair of switch-diode combinations is disposed between the first pair of switch-diode combinations and the motor.

5. The starter circuit of claim 1 further comprising at least one sensor for sensing an operating parameter of the motor, the controller controlling the state of at least one of the switches based on the sensed operating parameter.

6. For use with a multi-phase motor and a multi-phase power source providing positive and negative voltage alternations resulting in a load current in the motor having positive and negative alternations, a starter circuit for the motor comprising:

a first pair of switch-diode combinations electrically connected in series with the multi-phase power source and the multi-phase motor;

a second pair of switch-diode combinations electrically connected in parallel with the multi-phase power source and the multi-phase motor;

a controller programmed, based on the relative polarities of the supply voltage and the load current, to maintain the switches of two switch-diode combinations in an open position, to maintain the switch from one of the switch-diode combinations in a closed position, and to cycle the switch from one of the switch-diode combinations between an open state and a closed state, so as to provide pulse-width-modulated current to the motor during starting.

7. The starter circuit of claim 6 wherein each switch-diode combination includes a pair of switches electrically connected in parallel with a pair of diodes, and wherein the diodes are electrically configured such that only one diode of each combination conducts at a time.

8. The starter circuit of claim 7 wherein the second pair of switch-diode combinations is disposed between the first pair of switch-diode combinations and the motor.

9. The starter circuit of claim 7 further comprising at least one sensor for sensing an operating parameter of the motor, wherein the controller controls the switches based on the sensed operating parameter.

10. The starter circuit of claim 9 wherein the sensed operating parameter may be at least one of rotor acceleration, rotor velocity, and torque.

11. For use with a multi-phase motor and a multi-phase power source providing source voltage in the form of positive and negative voltage alternations resulting in a load current in the motor having positive and negative alternations, a starter circuit for the motor comprising, for each phase:

a first pair of switch-diode combinations electrically connected in series with the multi-phase power source and the multi-phase motor, each of the switches having an open state and a closed state;

a second pair of switch-diode combinations electrically connected in parallel with the multi-phase power source and the multi-phase motor, each of the switches having an open state and a closed state;

a controller programmed to control the state of the switches of the switch-diode combinations, based on the relative polarities of the supply voltage and the load current, so as to provide pulse-width modulated current to the motor when the supply voltage and the load current have similar polarities and to recover energy trapped in the motor back to the multi-phase source when the supply voltage and load current have opposite polarities.

12. The starter circuit of claim 11 wherein each switch-diode combination includes a pair of switches electrically connected in parallel with a pair of diodes, and wherein the diodes are electrically configured such that only one diode of each combination conducts at a time.

13. The starter circuit of claim 11 wherein the controller is programmed to maintain the switches of two switch-diode combinations in an open position, to maintain the switch from one of the switch-diode combinations in a closed position, and to cycle the switch from one of the switch-diode combinations between an open state and a closed state.

14. A method, for use with a starter circuit for a multi-phase motor and a multi-phase power source providing source voltage in the form of positive and negative voltage alternations resulting in a load current in the motor having positive and negative alternations, the starter circuit including a first pair of switch-diode combinations electrically connected in series with the multi-phase power source and the multi-phase motor, a second pair of switch-diode combinations electrically connected in parallel with the multi-phase power source and the multi-phase motor, each of the switches having an open state and a closed state, and a controller, the method comprising the step of controlling the state of the switches of the switch-diode combinations based on the relative polarities of the supply voltage and the load current so as to provide pulse-width modulated current to the motor during starting and to recover energy trapped in the motor back to the multi-phase source when the supply voltage and load current have opposite polarities.

15. The method of claim 14 wherein the step of controlling the state of the switches includes the substeps of:

maintaining the switches of two switch-diode combinations in an open state;

maintaining the switch from one of the switch-diode combinations in a closed position; and cycling the switch from one of the switch-diode combinations between an open state and a closed state, so as to provide pulse-width-modulated current to the motor during starting.

16. The method of claim 15 wherein the steps of maintaining the switches include the substep of controlling the state of the switches so that energy trapped in the motor is recovered to the power source when the supply voltage and the load current have opposite polarities.

* * * * *